US012031509B2

(12) United States Patent
Wieschollek et al.

(10) Patent No.: US 12,031,509 B2
(45) Date of Patent: Jul. 9, 2024

(54) FUEL INJECTOR INCLUDING TERMINAL BLADE

(71) Applicant: Robert Bosch GmbH, Stuttgart (DE)

(72) Inventors: Sebastian Wieschollek, Ann Arbor, MI (US); Manoj Menon, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/784,926

(22) PCT Filed: Dec. 9, 2020

(86) PCT No.: PCT/EP2020/085192
§ 371 (c)(1),
(2) Date: Jun. 13, 2022

(87) PCT Pub. No.: WO2021/122188
PCT Pub. Date: Jun. 24, 2021

(65) Prior Publication Data
US 2023/0011415 A1 Jan. 12, 2023

Related U.S. Application Data

(60) Provisional application No. 62/949,530, filed on Dec. 18, 2019.

(51) Int. Cl.
*F02M 51/00* (2006.01)
*F02M 61/16* (2006.01)

(52) U.S. Cl.
CPC ........ *F02M 51/005* (2013.01); *F02M 61/168* (2013.01); *F02M 2200/16* (2013.01); *F02M 2200/8023* (2013.01)

(58) Field of Classification Search
CPC ......... B29C 2045/14131; B29C 33/126; B29L 2031/3481
See application file for complete search history.

(56) References Cited

U.S. PATENT DOCUMENTS 3,725,843 A 4/1973 Johnson
4,452,504 A 6/1984 Conrad et al.
(Continued)

FOREIGN PATENT DOCUMENTS

EP 1755133 2/2007
WO 2019224929 11/2019

OTHER PUBLICATIONS

International Search Report corresponding to International Patent Application No. PCT/EP2020/085192, mailed Feb. 24, 2021 (4 pages).

*Primary Examiner* — John Kwon
(74) *Attorney, Agent, or Firm* — Kelly McGlashen; Maginot, Moore & Beck LLP

(57) ABSTRACT

A fuel injector assembly includes a valve housing, a valve stem that is disposed in the valve housing, a magnetic coil that surrounds the valve housing and is used to displace the valve stem within the valve housing, and a terminal blade. The terminal blade includes a bus bar that provides an electrical connection between the magnetic coil and an external connector. In addition, the terminal blade includes a clip that is connected to the bus bar at a clip first end and to the valve housing at a clip second end. The clip includes a sacrificial portion that is configured to part, for example by dissolving, when the terminal blade undergoes an overmolding process. As a result of the overmolding process, the clip is separated into multiple, spaced portions.

19 Claims, 12 Drawing Sheets

(56) References Cited

U.S. PATENT DOCUMENTS

| | | | | |
|---|---|---|---|---|
| 6,040,525 | A | 3/2000 | Chauquet | |
| 6,102,303 | A * | 8/2000 | Bright | F02M 51/005 239/585.4 |
| 6,109,543 | A * | 8/2000 | Bright | F02M 51/0671 239/585.4 |
| 2018/0205160 | A1 | 7/2018 | Boisnier et al. | |
| 2020/0156294 | A1 * | 5/2020 | Sahiner | H01R 43/24 |

* cited by examiner

FUEL INJECTOR INCLUDING TERMINAL BLADE

BACKGROUND

A fuel injector used to inject fuel into an internal combustion engine may include a valve housing that supports an injector valve, and a magnetic coil that surrounds the valve housing and is used to actuate the valve. The magnetic coil is controlled by a controller that is remote from the fuel injector. The fuel injector includes bus bars that are electrically connected at one end to the magnetic coil, and at an opposed end provide an electrical connection to controller. In some fuel injectors, a plastic overmold is used to support the bus bars relative to the valve housing, and to seal the bus bar from the environment. Since a clip is used to support the bus bars relative to the valve housing during the overmolding process, the overmold may not provide a complete seal between the bus bars and the valve housing. That is, in some fuel injectors there is a chance of leakage of the environment into the injector and/or around the bus bars in the vicinity of the clip. In some fuel injectors, the clip has been provided with a labyrinth seal intended to minimize or eliminate leakage. However, the labyrinth seal provided on the clip is effective under specific over-molding process conditions that may not apply to all fuel injectors. For example, the labyrinth seal provided on the clip may not be effective for some relatively short fuel injectors for reasons related to manufacturing, such as location and orientation of injection of plastic for the overmold of a relatively short fuel injector. In addition, although it is known that an effective seal can be obtained when the tip of the labyrinth is sharp, a labyrinth having a tip that is sharp is difficult to realize from a molding process perspective. Still further, to avoid a damage of the labyrinth during handling and/or transportation, additional measures are required which add cost and complexity to the manufacturing process. Thus, it is desirable to provide a fuel injector having an overmold that supports a bus bar and is leak free regardless of fuel injector size. It is also desirable to provide a clip that secures a bus bar to the fuel injector housing that facilitates formation of the leak free overmold.

SUMMARY

In some aspects, a terminal blade for a fuel injector includes include a valve housing that supports an injector valve, and a magnetic coil that surrounds the valve housing and is configured to actuate the valve. The terminal blade is configured to provide an electrical connection between the magnetic coil and an electrical connector. The terminal blade includes an electrically conductive bus bar that is configured to form an electrical connection with the electrical connector and the magnetic coil; and a clip that is connected to the bus bar at a clip first end and to the valve housing at a clip second end. The clip includes a sacrificial portion. The sacrificial portion is configured to part when the terminal blade undergoes an overmolding process in such a way that the clip is separated into multiple portions.

In some embodiments, the sacrificial portion is configured to dissolve when the terminal blade undergoes an overmolding process. In other embodiments, the sacrificial portion is configured to break when the terminal blade undergoes an overmolding process.

In some embodiments, the sacrificial portion is disposed between the clip first end and the clip second end.

In some embodiments, the clip includes an elongate body having a body first end that is secured to the bus bar and a body second end that is opposed to the body first end. The body first end corresponds to the clip first end. The clip includes an elastic portion that is configured to encircle a portion of the valve housing, the elastic portion corresponding to the clip second end. In addition, the clip includes a bridge that connects the body second end to the elastic portion. One of the body and the bridge includes the sacrificial portion.

In some embodiments, the body includes a body mid portion disposed between the body first end and the body second end. The body mid portion includes the sacrificial portion.

In some embodiments, the sacrificial portion is a single connecting structure having a cross sectional dimension that is in a range of 0.2-0.5 times the cross sectional dimension of the body.

In some embodiments, the sacrificial portion includes at least two connecting structures, and cross sectional dimensions of each of the at least two connecting structures have a range of 0.2-0.5 times a cross sectional dimension of the body.

In some embodiments, the sacrificial portion comprises a first connecting structure and a second connecting structure that is spaced apart from the first connecting structure. Each of the first connecting structure and the second connecting structure extends in parallel to a clip body longitudinal axis and providing a mechanical connection between the first end and the second end.

In some embodiments, the bridge comprises the sacrificial portion.

In some embodiments, the bridge has a dimension in a direction parallel to a longitudinal axis of the valve housing that is less than a dimension of the elastic portion in a direction parallel to the longitudinal axis of the valve housing.

In some embodiments, the bridge, including the sacrificial portion, is connected to the elastic portion along an edge of the elastic portion.

In some embodiments, body includes a body longitudinal axis that extends between the body first end and the body second end. The body is elongated along a body longitudinal axis. The body longitudinal axis extends in parallel to a longitudinal axis of the valve housing, and the bridge extends in a direction perpendicular to the body longitudinal axis.

In some embodiments, the bus bar has a bus bar first end and a bus bar second end, and the clip body first end is fixed to the bus bar at a location that is disposed between the bus bar first end and the bus bar second end.

In some embodiments, the clip comprises two sacrificial portions.

In some aspects, a fuel injector assembly includes a valve housing; and a valve stem that is disposed in the valve housing and moveable relative to an inner surface of the valve housing along a valve housing longitudinal axis. The fuel injector assembly includes a magnetic coil that surrounds the valve housing and is used to actuate the valve stem; and a terminal blade that is configured to provide an electrical connection between the magnetic coil and an external connector. The terminal blade includes an electrically conductive bus bar that is configured to form an electrical connection with the external connector and the magnetic coil; and a clip that is connected to the bus bar at a clip first end and to the valve housing at a clip second end. The clip includes a sacrificial portion. The sacrificial portion is configured to part, for example by dissolving or breaking, when the terminal blade undergoes an overmolding process in such a way that the clip is separated into multiple portions.

In some embodiments, the clip includes an elongate body having a body first end that is secured to the bus bar and a body second end that is opposed to the body first end. The body first end corresponds to the clip first end. The clip includes an elastic portion that is configured to encircle a portion of the valve housing, the elastic portion corresponding to the clip second end, and a bridge that connects the body second end to the elastic portion. One of the body and the bridge includes the sacrificial portion.

In some embodiments, the body includes a body mid portion disposed between the body first end and the body second end. The body mid portion includes the sacrificial portion.

In some embodiments, the bridge comprises the sacrificial portion.

In some embodiments, the clip comprises two sacrificial portions.

In some embodiments, the fuel injector assembly includes an overmold that encases the clip and a portion of the bus bar. The overmold and the clip are formed of the same material.

In some embodiments, the fuel injector assembly includes an overmold that encases the clip and a portion of the bus bar. The overmold is formed of a first material, and the clip is formed of a second material. A melting temperature of the second material is less than or equal to a melting temperature of the first material.

In some aspects, a method of manufacturing a fuel injector is disclosed. The method includes the following method steps: Providing a partially assembled fuel injector that includes a valve housing, a valve stem movable within the valve housing and a magnetic coil surrounding the valve housing; Providing a terminal blade that comprises: an electrically conductive bus bar that is configured to form an electrical connection with an electrical connector and the magnetic coil; and a clip that is connected to the bus bar at a clip first end and to the valve housing at a clip second end, the clip including a sacrificial portion, the sacrificial portion configured to part, for example by dissolving, when the terminal blade undergoes an overmolding process; Securing the terminal blade to the valve housing using the clip; Electrically connecting the bus bar to the magnetic coil; and Overmolding portions of the terminal blade and the valve housing with a plastic coating in such a way that the portions are encased and the sacrificial portion is parted.

In some embodiments, the step of overmolding portions of the terminal blade and the valve housing includes using an injection molding process to encase the portions in a plastic coating, and the plastic coating and the clip are formed of the same material.

In some embodiments, the step of overmolding portions of the terminal blade and the valve housing includes using an injection molding process to encase the portions in a plastic coating. The plastic coating is formed of a first material, the clip is formed of a second material, and a melting temperature of the second material is less than or equal to a melting temperature of the first material.

In some embodiments, the step of overmolding portions of the terminal blade and the valve housing with a plastic coating comprises injecting a plastic into a mold that surrounds a portion of the fuel injector including the clip, and a direction of injection of the plastic into the mold is perpendicular to a longitudinal axis of the valve housing.

In some aspects, a terminal blade for a fuel injector assembly includes a sacrificial portion that melts, dissolves or otherwise is removed during the manufacturing process step of applying an overmold to the fuel injector assembly. As a result, the overmold, which supports the bus bar relative to the fuel injector housing and provides an electrical connector housing, also forms a leak-free seal with respect to the valve housing of the fuel injector, whereby moisture is prevented from contacting the bus bar.

A method of manufacturing a fuel injector using a terminal blade having a sacrificial portion is also described.

In some aspects, a self-supporting electrical conductor includes an electrically conductive element that is configured to electrically connect a first electrical component to a second electrical component, and a clip that is configured to support the element relative to a device. The clip includes a clip first end that is connected to the element, a clip second end is configured to mount on the device, and a sacrificial portion disposed between the clip first end and the clip second end. An overmold encapsulates at least a portion of the clip and the element. In addition, the sacrificial portion is configured to part, for example by dissolving or breaking, when the self-supporting electrical conductor undergoes an overmolding process to provide the overmold, the parting occurring in such a way that the clip is separated into multiple portions.

DETAILED DESCRIPTION

Figure 1:
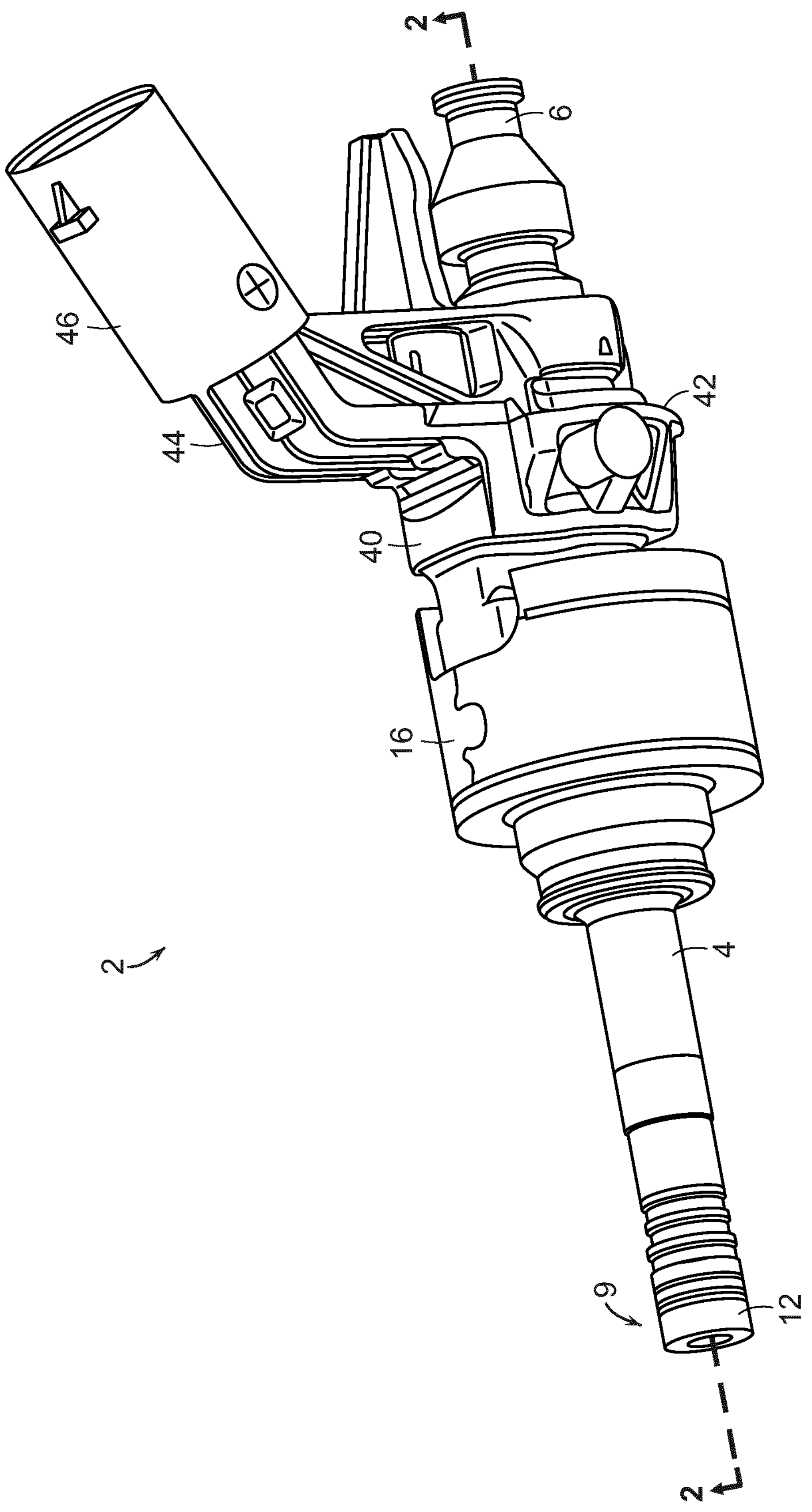
FIG. 1 is a perspective view of a fuel injector assembly.
Figure 2:
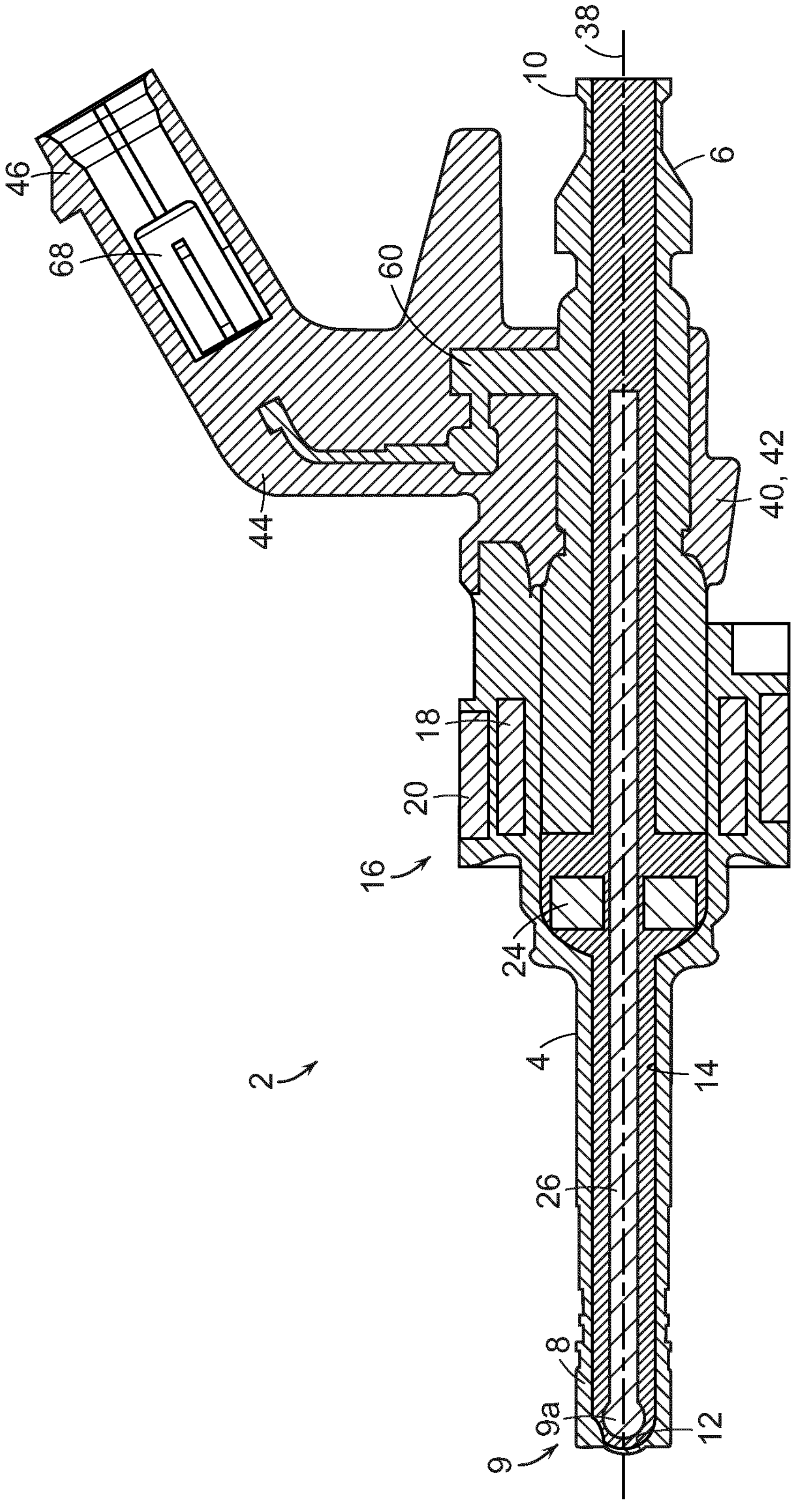
FIG. 2 is a cross sectional view of the fuel injector assembly as seen along line 2-2 of FIG. 1.
Figure 3:
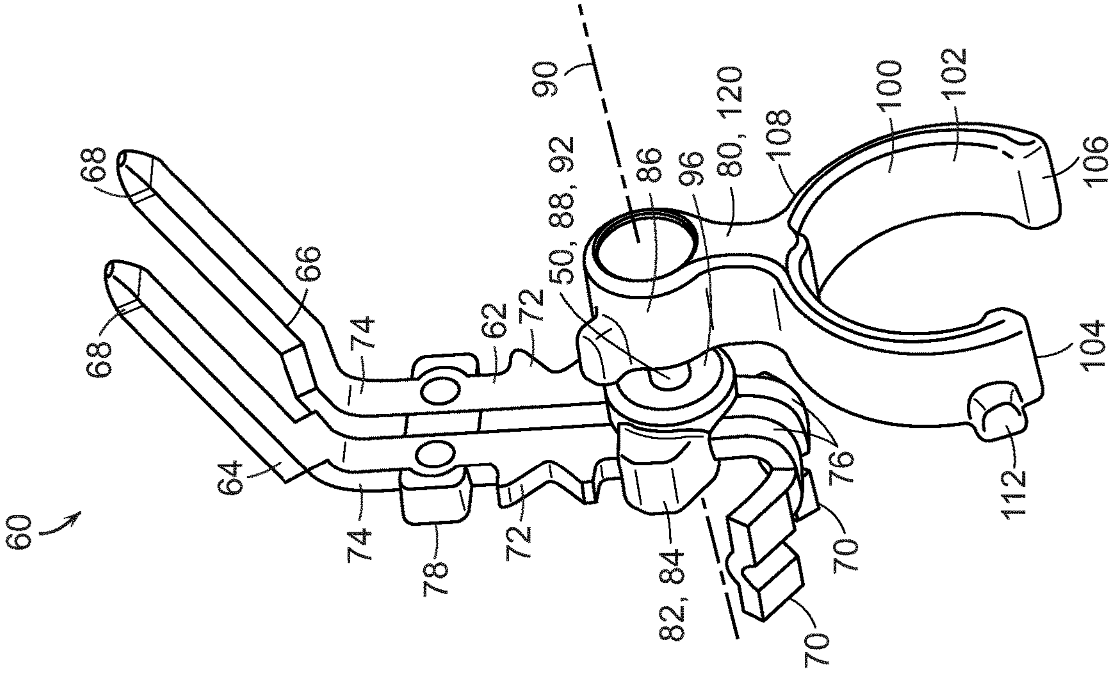
FIG. 3 is a perspective view of a terminal blade.

Referring to FIGS. 1-6, a fuel injector 2 is part of a fuel injection system used to inject fuel into an internal combustion engine (not shown). For example, the fuel injector 2 may be a high pressure device used for direct injection into a cylinder of a gasoline engine. The fuel injector 2 may include an elongate, generally tubular valve housing 4 that supports an injector valve 9, and a solenoid 16 that surrounds the valve housing 4 and is used to actuate the valve 9. A terminal blade 60 is used to provide an electrical connection between the solenoid 16 and an external connector (not shown). The terminal blade 60 includes an electrically conductive bus bar 62 and a clip 80. The bus bar 62 provides an electrical connection between the solenoid and the connector, while the clip 80 mechanically supports the bus bar 62 in a desired position relative to the valve housing 4 during manufacture and assembly of the fuel injector 2. The fuel injector 2 includes an electrically insulating overmold 40 that is used to maintain the bus bar 62 in the desired position with respect to the valve housing 4 following manufacture and assembly. The clip 80 includes a sacrificial portion that is configured to part during the process of forming the overmold 40, whereby the clip 80 is separated into a bus bar portion 61 and a clip portion 81 that are physically spaced apart. As a result of the parting of the sacrificial portion 50 and division of the clip 80 into two separate portions 61, 81, the overmold 40 effectively encases portions of the bus bar 62 and the valve housing 4 and seals the bus bar 62 from the environment, as discussed further below.

The valve housing 4 is an elongate, generally tubular structure. A first end 6 of the valve housing 4 provides a fuel connection nipple 10, and a second, opposed end 8 of the valve housing 4 provides a valve seat 12 and opening (not shown). An inner surface of the valve housing 4 defines a fuel duct 14 that extends between the fuel connection nipple 10 and the valve seat 12.

The solenoid 16 includes a magnetic coil 18 wound on a coil brace, and a magnetic sleeve 20 that surrounds the magnetic coil 18. The magnetic sleeve 20 is fixed to an outer surface of the valve housing 4 at a location disposed between the connection nipple 10 and the valve opening provided in the valve seat 12. An armature 24 is moveable in reaction to the magnetic coil 18 along the longitudinal axis 38 of the valve housing 4 and is permanently connected to a valve needle 26, which in turn is connected to the ball 9*a* of the valve 9.

The overmold 40 is formed of an electrically insulating material such as plastic, and includes an annular portion 42 that encircles a circumference of the valve housing 4 at a location between the magnetic sleeve 20 and the connection nipple 10, and a connector portion 44 that protrudes outward from the annular portion 42. The connector portion 44 includes a shroud 46 that surrounds a first end 68 of the bus bar 62, and is configured to receive the external connector therein. When the external connector is received within the connector shroud 46, an electrical connection is provided between the magnetic coil 18 and an electronic control unit (not shown). The electronic control unit controls the magnetic coil 18, and thus also controls fuel distribution from the fuel injector 2.

Figure 4:
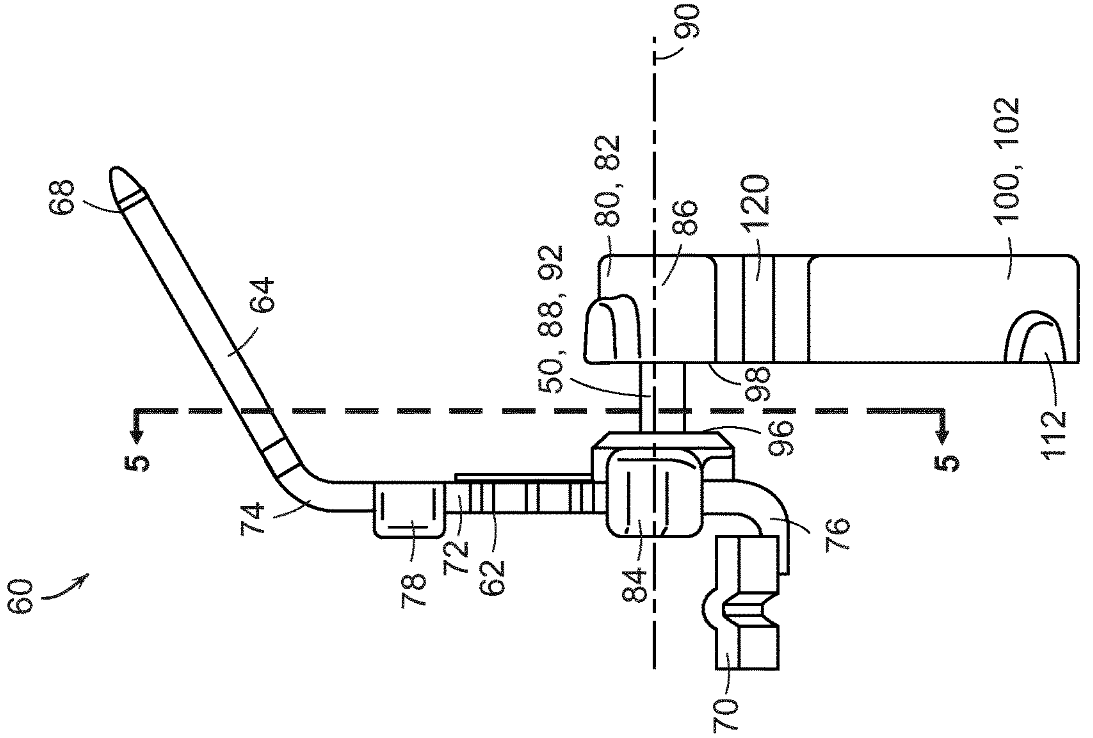
FIG. 4 is a side view of the terminal blade of FIG. 3.
Figure 5:
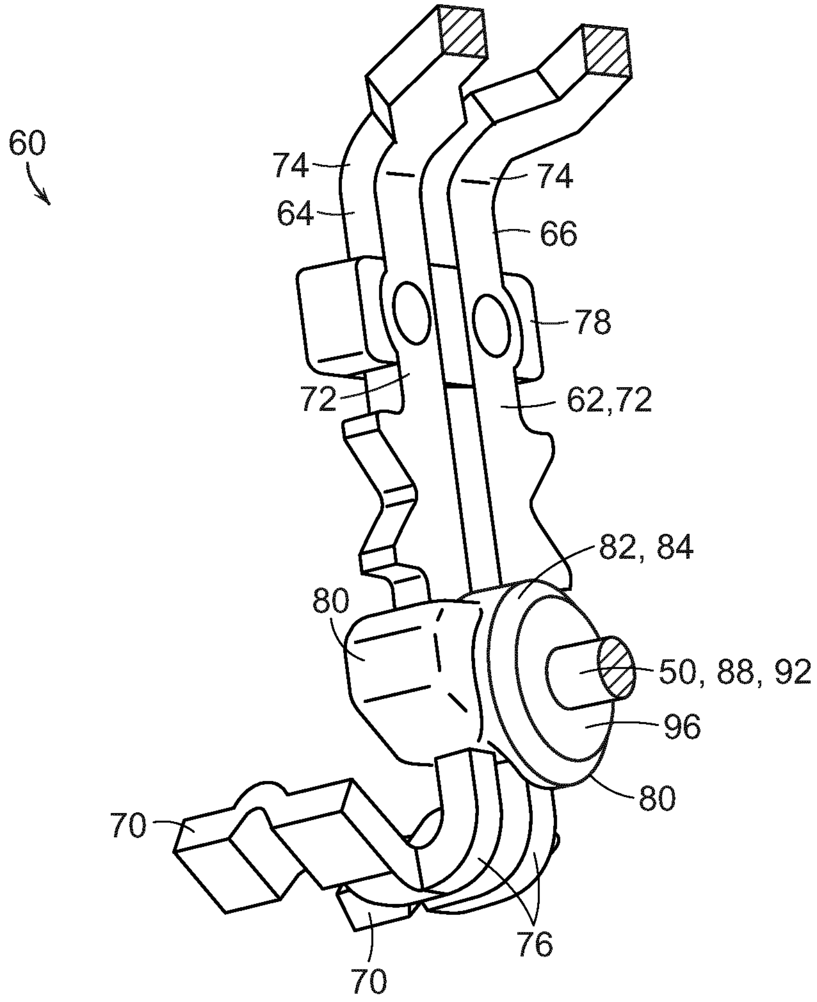
FIG. 5 is a perspective cross sectional view of the terminal blade of FIG. 3 as seen along line 5-5 of FIG. 4.
Figure 6:
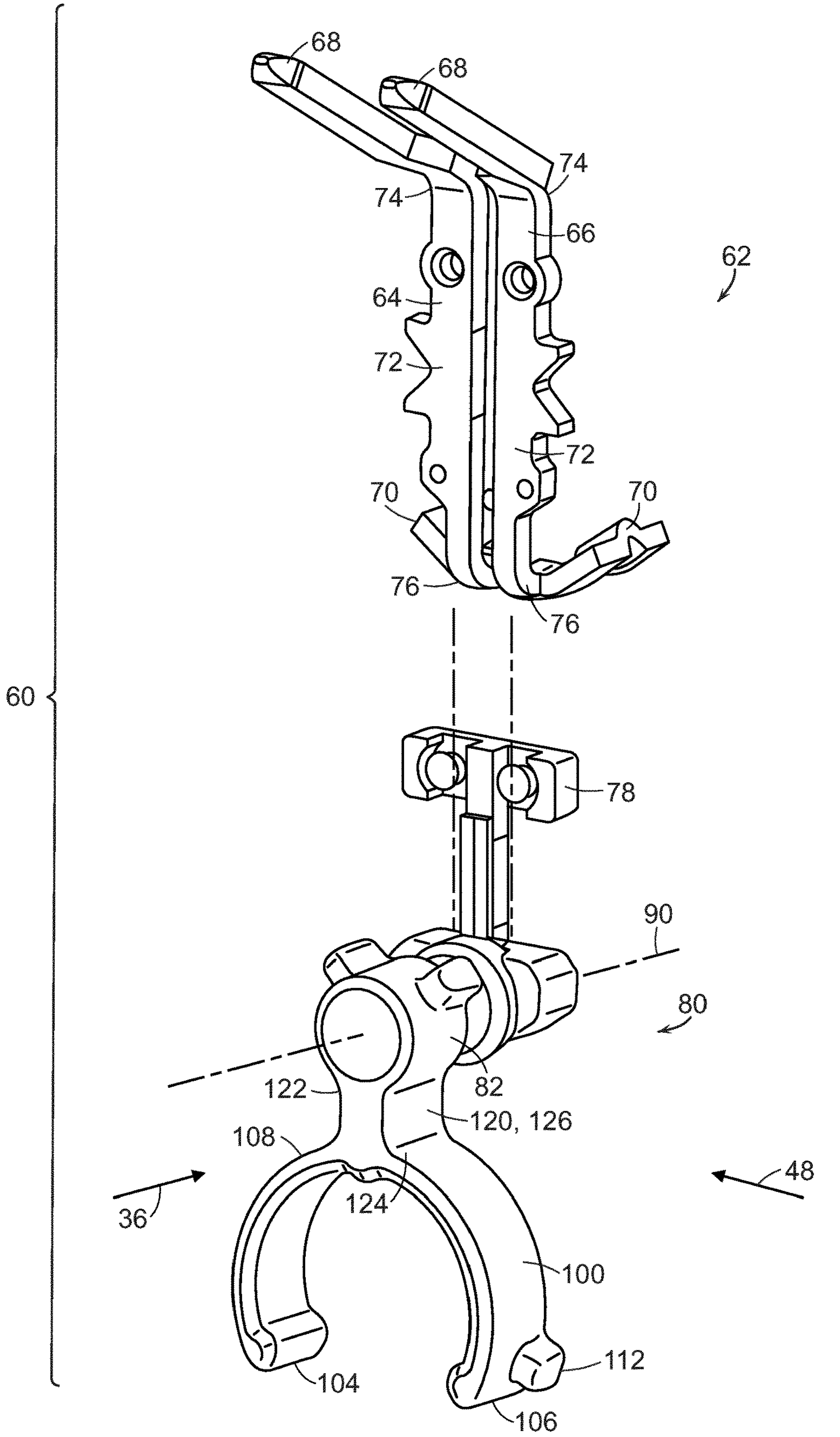
FIG. 6 is an exploded perspective view of the terminal blade of FIG. 3.
Figure 7:
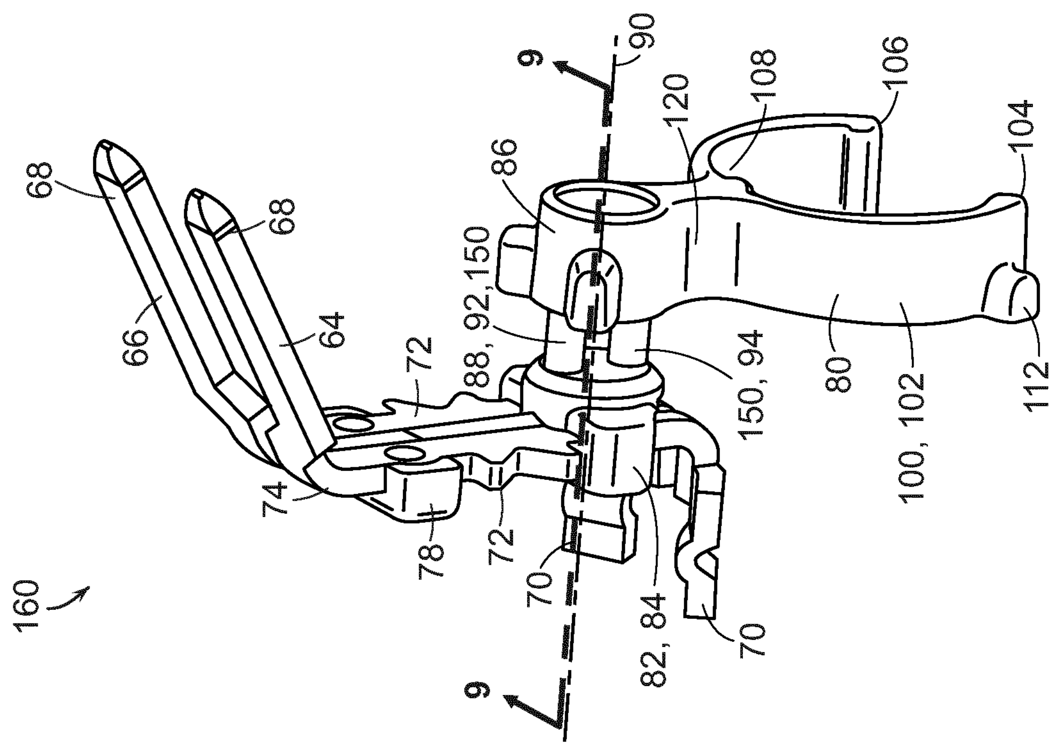
FIG. 7 is a perspective view of an alternative embodiment terminal blade.

Referring to FIGS. 3-6, the terminal blade 60, which includes the bus bar 62 and the clip 80, is used during manufacture of the fuel injector 2 to secure the bus bar 62 relative to the valve housing 4 during manufacturing method steps that occur before the overmold 40 has been applied. The bus bar 62 includes a pair of electrically conductive pins 64, 66 and an electrically insulating brace 78 that holds the pins 64, 66 in a parallel, spaced apart configuration. Each pin 64, 66 includes the pin first end 68 that is disposed in the connector shroud 46, a pin second end 70 that is opposed to the pin first end 68, and a pin mid portion 72 disposed between the pin first end 68 and the pin second end 70. In the illustrated embodiment, the pins 64, 66 are elongated and include a first bend 74 disposed between the pin mid portion 72 and the pin first end 68, and a second bend 76 disposed between the mid portion 72 and the pin second end 70. The first bend 74 is in a direction that is opposed to a direction of the second bend 76, whereby each pin 64, 66 generally has a Z shape when the bus bar 62 is viewed in side view (FIG. 4). The brace 78 engages the pin mid portion 72 at a location adjacent to the first bend 74.

The clip 80 is free of a labyrinth seal and includes an elongate body 82 that is secured to the bus bar 62, an elastic portion 100 that forms a mechanical connection with the valve housing 4, and a bridge 120 that extends between, and mechanically connects, the body 82 to the elastic portion 100.

The clip body 82 has a generally cylindrical shape and includes a body first end 84, and a body second end 86 that is opposed to the body first end 84. The body first end 84 is also referred to herein as the clip first end. The body 82 includes body mid portion 88 that is disposed between the body first end 84 and the body second end 86. In addition, the body 82 includes a longitudinal axis 90 that passes through the body first end 84, the body mid portion 88 and the body second end 86. The body first end 84 is overmolded onto the mid portion 72 of the bus bar 62 at a location adjacent to the second bend 76. The body first end 84 is overmolded onto the bus bar 62 in such a way that the body 82 is fixed to the bus bar mid portion 72, and the bus bar mid portion 72 extends in a direction that is perpendicular to the body longitudinal axis 90. In this configuration, the bus bar first end 68 overlies the body 82 and is angled relative to the body longitudinal axis 90. In addition, the bus bar second end 70 protrudes in a direction away from the body 82 in a direction that is generally parallel to the body longitudinal axis 90.

The elastic portion 100 is an arcuate band 102 that encircles a portion of the circumference of the valve housing 4. The band 102 includes a first end 104, a second end 106, and a mid portion 108 disposed between the first and second ends 104, 106. The elastic portion 100 has elastic properties, extends over an arc length that is greater than 180 degrees and less than 270 degrees, and is dimensioned to grip the outer surface of the valve housing 4. By this configuration, the clip 80 is elastically retained in a desired position relative to the valve housing 4. At each of the first and second ends 104, 106, the outward-facing surface 110 of the band 102 includes a protrusion 112 that provides a key that engages with the overmold 40. The elastic portion 100 is also referred to herein as the clip second end.

The bridge 120 is a rigid structure that extends, and provides a mechanical connection, between the elastic portion mid portion 108 and the body second end 86. The bridge 120 includes a first end 122 that is joined to the body 82, a second end that is joined to the elastic portion 100 and a mid portion 126 that is disposed between the bridge first end 122 and the bridge second end 124. The bridge 120 is formed integrally with the elastic portion 100 and the body 82, and extends in a direction perpendicular to the body longitudinal axis 90. As a result, the bridge 120 serves to offset the body 82 from the valve housing 4 in a direction that is perpendicular to the valve housing longitudinal axis 38. In other words, the bridge 120 serves to offset the body 82 from the valve housing 4 in a direction that is radially outward relative to an outer surface of the valve housing 4.

The bridge 120 is generally rectangular in shape, and has a length dimension that extends in parallel with the body longitudinal axis 90, a height dimension that extends perpendicular to the body longitudinal axis 90 and parallel to a radius of the valve housing 4, and a width dimension that extends perpendicular to the body longitudinal axis 90 and the radius of the valve housing 4. When the clip 80 is viewed in a side view (e.g., in the direction of arrow 48 of FIG. 6), the bridge 120 has a length dimension that is equal to the corresponding dimension of the band 102 of the elastic portion 100. When the clip 80 is viewed in an end view (e.g., in the direction of arrow 36 of FIG. 6), the bridge 12 has a width dimension that is uniform along its height dimension.

In the illustrated embodiment, the clip 80 and the brace 78 are formed of the same material, for example, an insulating material such as plastic, whereas the pins 64, 64 are formed of an electrically conductive material such as metal.

The clip 80 of the terminal blade 60 is used to hold the bus bar 62 in a desired orientation and position relative to the valve housing 4 during a manufacturing step that precedes the overmolding step in which the overmolding is applied to the valve housing 4. For example, in some embodiments, the clip 80 supports the bus bar 62 during a welding step of the injector manufacturing process in which the bus bar second end 70 is welded to the magnetic coil 18. Once the weld has been achieved, the position of the bus bar 62 is fixed relative to the fuel injector 2 and the clip 80 is no longer required. In recognition of the fact that the clip 80 is not required for positioning and stabilization of the bus bar 62 following the welding step, the clip 80 includes the sacrificial portion 50 that parts during the process of forming the overmold 40. In this embodiment, the sacrificial portion dissolves during the process of overmolding. Since the sacrificial portion 50 dissolves during the overmolding process, the clip 80 is separated into a bus bar portion 61 and a clip portion 81 (FIG. 19) that are physically spaced apart. As a result of the division of the clip 80 into two separate portions 61, 81, the overmold 40 can effectively encase portions of the bus bar 62 and the valve housing 4 and seal the bus bar 62 from the environment.

In the embodiment illustrated in FIGS. 3-6, the body mid portion 88 provides the sacrificial portion 50. To this end, the body mid portion 88, e.g., the sacrificial portion 50 is a structure that has a reduced diameter relative to the body first end 84 and the body second end 86. For example, in the illustrated embodiment, the sacrificial portion 50 has a cross sectional dimension that is in a range of 0.2-0.5 times the cross sectional dimension of the respective body first and second ends 84, 86.

In some embodiments, the sacrificial portion 50 is a rigid rod 92 of uniform diameter that extends between, and physically connects, the body first end 84 and the body second end 86. Shoulders 96, 98 are disposed at the transition in diameter between the sacrificial portion 50 and the respective body first and second ends 84, 86. In other embodiments, the transition between the sacrificial portion 50 and the respective body first and second ends 84, 86 may be rounded. In the illustrated embodiment, the sacrificial portion 50 is concentric with the clip body 82.

The diameter of the sacrificial portion 50 is set so that during the process of overmolding, the sacrificial portion 50 dissolves and/or is otherwise severed due to the temperature and/or mass flow of the plastic used to form the overmold 40 as it is injected under high pressure in the vicinity of the terminal blade 60.

Figure 8:
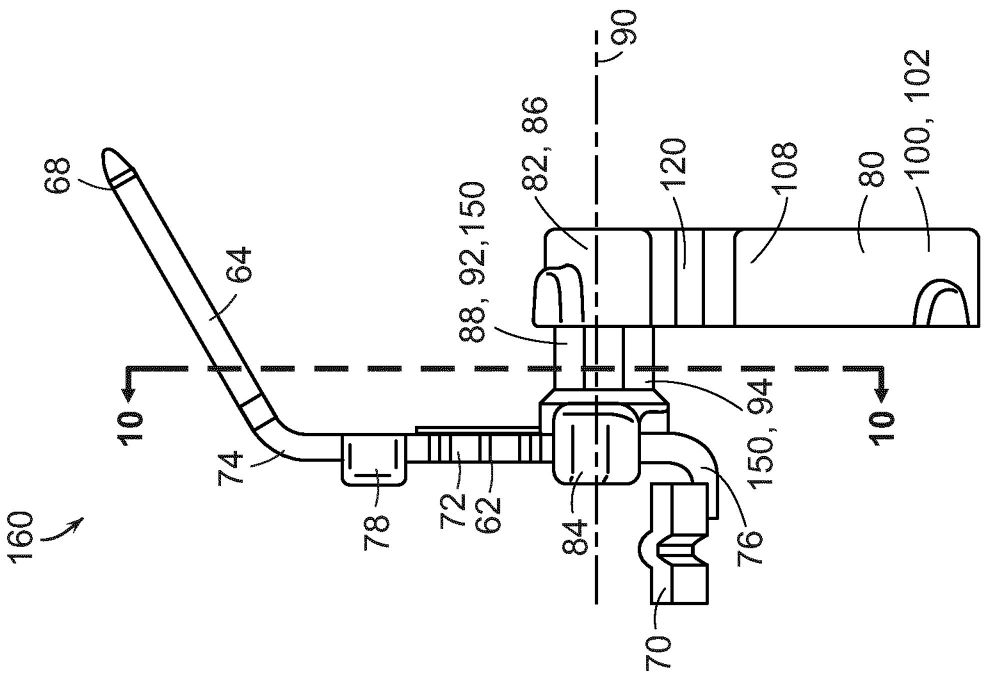
FIG. 8 is a side view of the terminal blade of FIG. 7.
Figure 9:
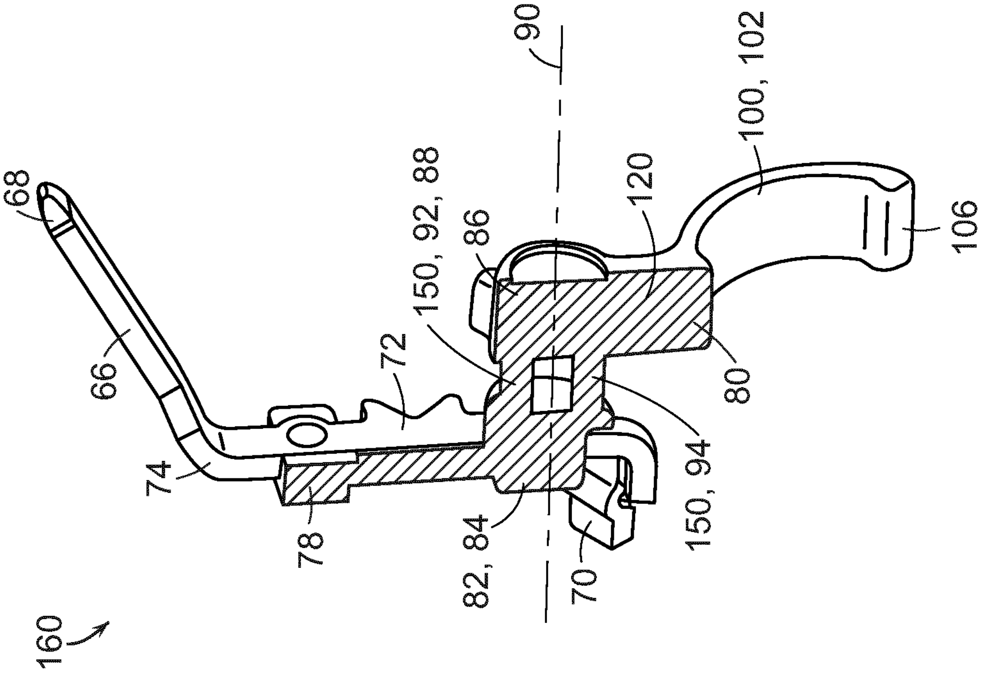
FIG. 9 is a perspective cross sectional view of the terminal blade of FIG. 7 as seen along line 9-9 of FIG. 7.
Figure 10:
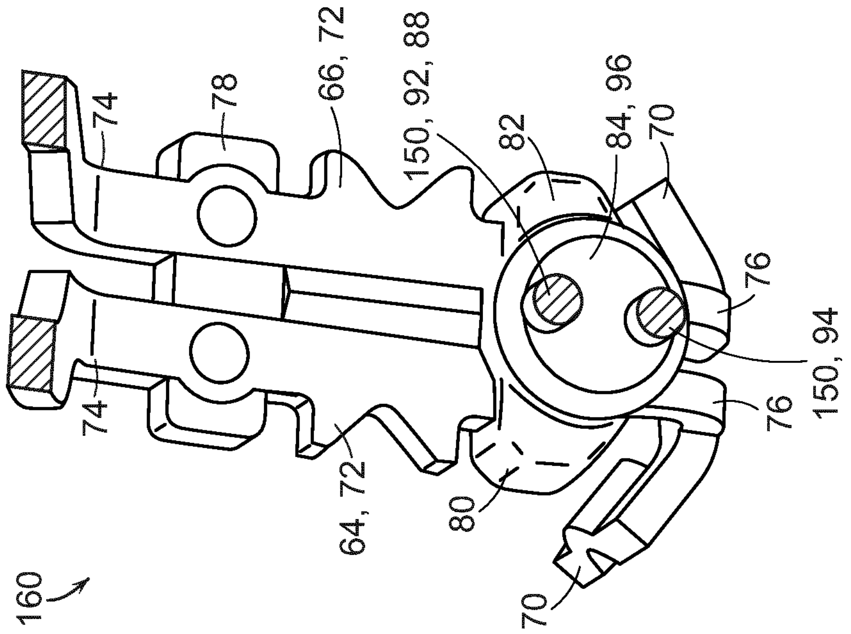
FIG. 10 is a perspective cross sectional view of the terminal blade of FIG. 7 as seen along line 10-10 of FIG. 8.
Figure 11:
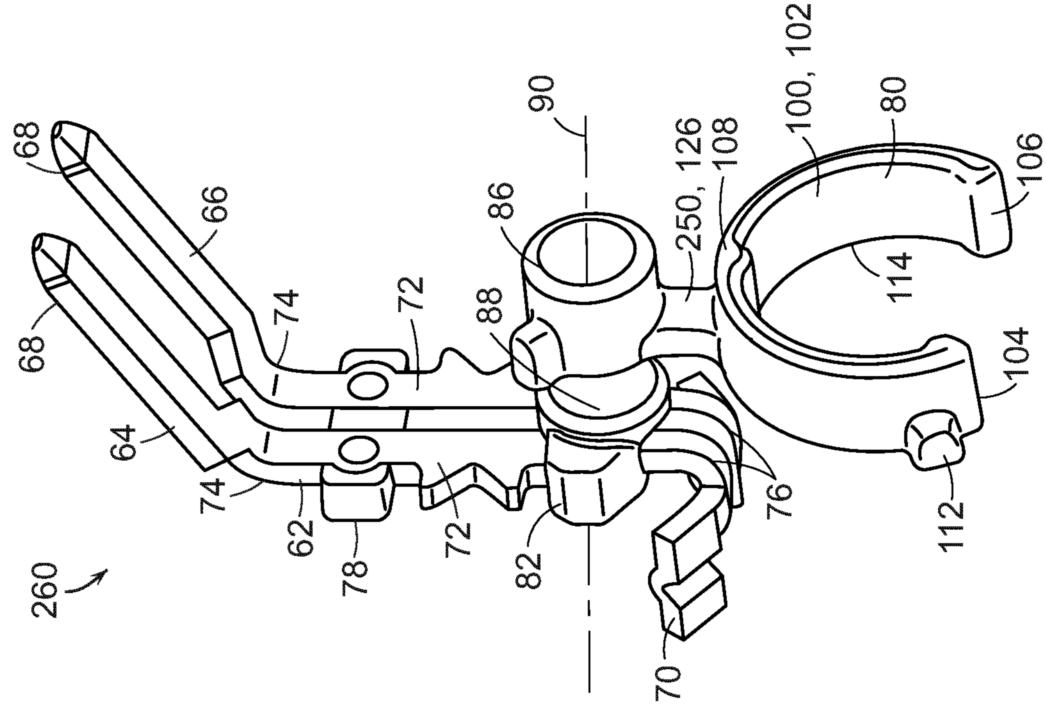
FIG. 11 is a perspective view of another alternative embodiment terminal blade.
Figure 12:
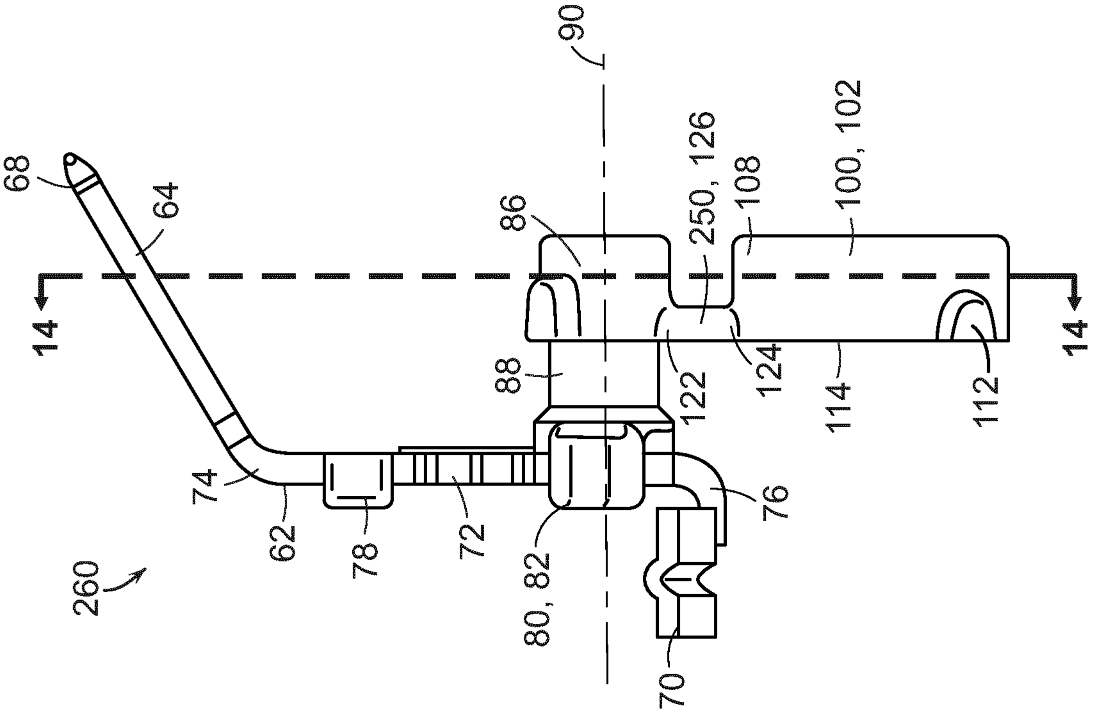
FIG. 12 is a side view of the terminal blade of FIG. 11.
Figure 14:
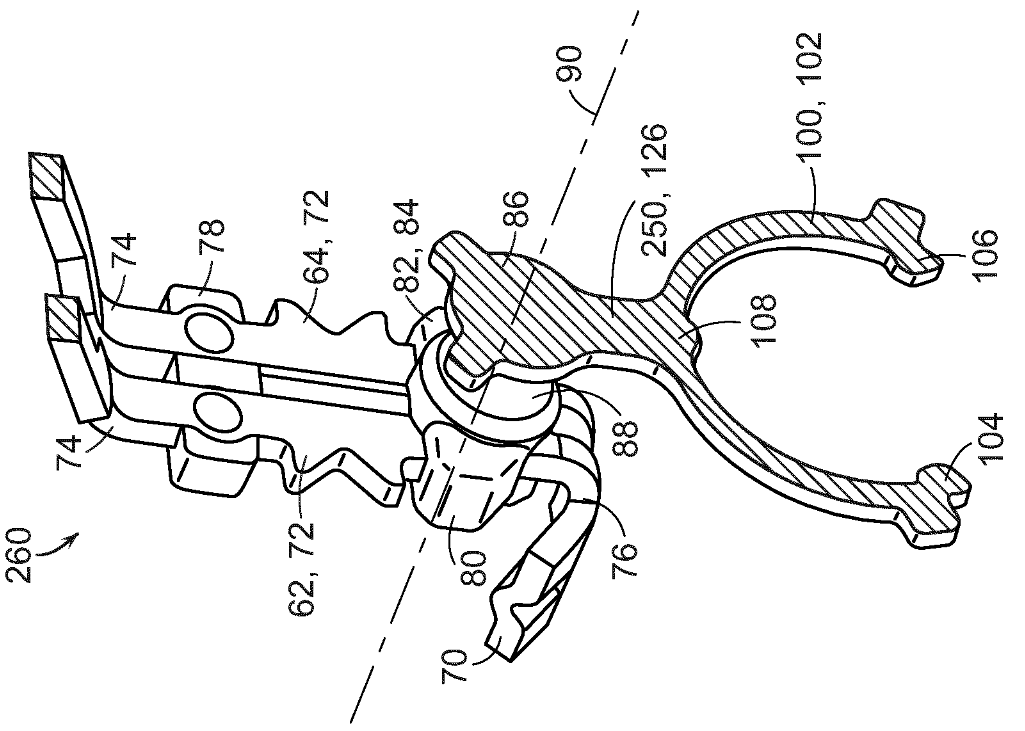
FIG. 14 is a perspective cross sectional view of the terminal blade of FIG. 11 as seen along line 14-14 of FIG. 12.
Figure 13:
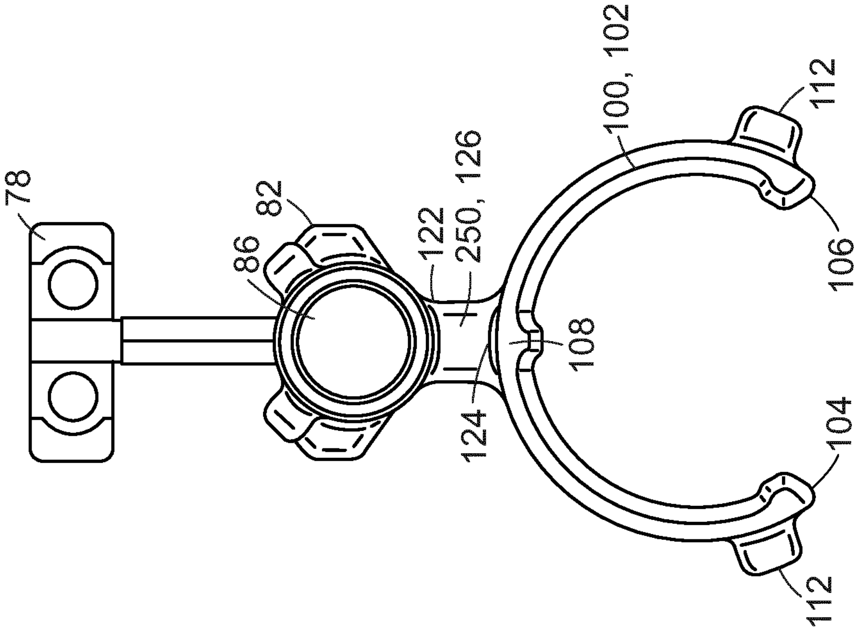
FIG. 13 is an end view of the terminal blade of FIG. 11, with the bus bar omitted.

Referring to FIGS. 7-10, an alternative embodiment terminal blade 160 will now be described. The terminal blade 160 of FIGS. 8-10 is similar to the terminal blade 60 of FIGS. 3-6, and common reference numbers are used to refer to common elements. The terminal blade 160 of FIGS. 7-10 differs from the terminal blade 60 of FIGS. 3-6 in that the sacrificial portion 150 comprises a pair of rigid rods 92, 94 of uniform diameter that extend between the body first end 84 and the body second end 86. In the illustrated embodiment, the rods 92, 94 extend in parallel to each other and to the body longitudinal axis 90. The rods 92, 94 are arranged so as to overlie each other when the fuel injection is viewed in side view. In other words, both rods 92, 94 reside in a common plane that extends radially from the valve housing longitudinal axis 38. The rods 92, 94 are spaced apart. In the illustrated embodiment, the rods 92, 94 are spaced apart to the greatest extent possible along a diameter of the body 82. In addition, each rod 92, 94 has a cross sectional dimension that is in a range of 0.2-0.5 times the cross sectional dimension of the respective body first and second ends 84, 86. During the process of overmolding, the sacrificial portion 150 dissolves and/or is otherwise severed due to the temperature and/or mass flow of the plastic used to form the overmold 40 as it is injected under high pressure in the vicinity of the terminal blade 160.

Referring to FIGS. 11-14, another alternative embodiment terminal blade 260 will now be described. The terminal blade 260 of FIGS. 11-14 is similar to the terminal blade 60 of FIGS. 3-6, and common reference numbers are used to refer to common elements. The terminal blade 260 of FIGS. 11-14 differs from the terminal blade 60 of FIGS. 3-6 in that the bridge mid portion 126 provides the sacrificial portion 250. To this end, the bridge mid portion 126, e.g., the sacrificial portion 250, has a reduced diameter relative to the bridge first end 122 and the bridge second end 124. In particular, when the clip 80 is viewed in a side view (FIG. 12), the bridge 120 including the sacrificial portion 250 has a length dimension that less than the corresponding dimension of the band 102 of the elastic portion 100. The bridge 120, including the sacrificial portion 250, is connected to the elastic portion 100 along an inside edge 114 of the elastic portion 100. In the illustrated embodiment, the bridge length dimension is in a range of 0.25 to 0.75 a length dimension of the band 102. When the clip 80 is viewed in an end view (FIG. 13), the bridge 120 has a width dimension that is non-uniform along its height dimension. As illustrated, the sacrificial portion 250 is shaped so that the transition between the sacrificial portion 250 and the respective bridge first and second ends 122, 124 is rounded. In some embodiments, the bridge mid portion 126 has a cross sectional dimension that is in a range of 0.4-0.8 times the cross sectional dimension of the respective bridge first and second ends 122, 124. During the process of overmolding, the sacrificial portion 250 dissolves and/or is otherwise severed due to the temperature and/or mass flow of the plastic used to form the overmold 40 as it is injected under high pressure in the vicinity of the terminal blade 260. For example, due to the relative thickness of the sacrificial portion 250, the sacrificial portion 250 may not fully dissolve, and instead be parted due to the material flow during injection of material into a mold. In this example, the flowing material may push the elastic portion100 in such a way that the sacrificial portion 250 parts via bending or tensile forces.

Figure 15:
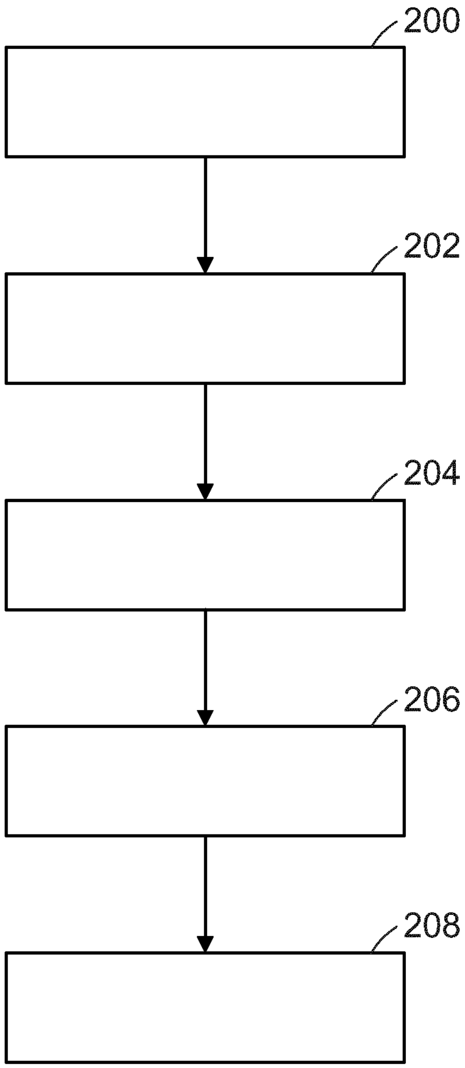
FIG. 15 is a flow diagram illustrating a method of manufacturing the fuel injector.

Referring to FIG. 15, a method of manufacturing the fuel injector 2 using the terminal blade 60 will now be described. The method provides the fuel injector 2 in which the overmold 40 forms a leak-free seal with respect to the valve housing 4, whereby moisture is prevented from contacting the bus bar 62. In the method, as an initial step, a partially assembled fuel injector is provided that includes a valve housing, a valve stem movable within the valve housing, a magnetic coil surrounding the valve housing, and other ancillary structures (step 200). In addition, a terminal blade 60 is provided (step 202) in which the clip 80 includes the sacrificial portion 50. The terminal blade 60 is secured to the valve housing 4 (step 204) by attaching the elastic portion 100 to an outer surface of the valve housing 4 at a location between the magnetic coil 18 and the valve housing first end 6. When the terminal blade 60 is secured to the valve housing 4, the bus bar 62 is arranged so that the second end 70 of each pin 64, 66 of the bus bar 62 is adjacent to a portion of the magnetic coil 18, and the first end 68 of each pin 64, 66 of the bus bar 62 overlies the clip body 82. In this configuration, the first end 68 of each pin 64, 66 is spaced apart from the valve housing outer surface and extends toward the valve housing first end 6.

After the terminal blade 60 is secured to the valve housing 4, the method includes electrically connecting the bus bar 62 to the magnetic coil 18 (step 206). For example, in some embodiments, the second end 70 of each pin 64, 66 is welded to a portion of the magnetic coil 18. As previously discussed, once the weld has been made, the position of the bus bar 62 is fixed relative to the fuel injector 2 and the clip 80 is no longer required.

Following the step of electrically connecting the bus bar 62 to the magnetic coil 18, portions of the terminal blade 60 and the valve housing 4 are overmolded with a plastic coating (step 208). As a result of this step, the plastic overmold 40 is formed on the valve housing 4. In particular, the annular portion 42 surrounds a circumferences of the valve housing 4 at a location adjacent to the solenoid 16 in such a way that the bus bar second end 70 including the weld and the bus bar mid portion 72 are encased in plastic. The bus bar first end 68 is exposed, but is surrounded by the shroud 46 of the connector portion 44. In addition, the entire clip 80 is encased in the annular portion of plastic coating.

In some embodiments, the overmold is achieved using an injection molding process. During the injection molding process, the plastic used to form the overmold 40 is injected into an overmold tool (not shown) that surrounds the valve housing 4 and terminal blade 60. The plastic is molten and injected under high pressure into the overmold tool in a direction perpendicular to the valve housing longitudinal axis 38 at a location that is generally aligned with the clip body 82 and/or bridge 120. Thus, during plastic injection, molten plastic flows toward and then around the clip 80. In the illustrated embodiment, the material used to form the clip 80 is the same as the material used to form the overmold 40, whereby the melting temperature of the clip 80 is the same as the melting temperature of the overmold 40. The presence of the molten overmold plastic as it is injected around the body mid portion 88 results in melting of the sacrificial portion 50. In addition, flow of the high pressure injected material exerts pressure against the sacrificial portion 50 that facilitates its dissolution. As a result of the dissolution of the sacrificial portion 50, the clip 80 is divided into two separate portions 61, 81. The space previously occupied by the sacrificial portion 50 becomes occupied by the overmold material, allowing the overmold 40 to effectively encase portions of the bus bar 62 and the valve housing 4, and seal the bus bar 62 from the environment.

Figure 16:
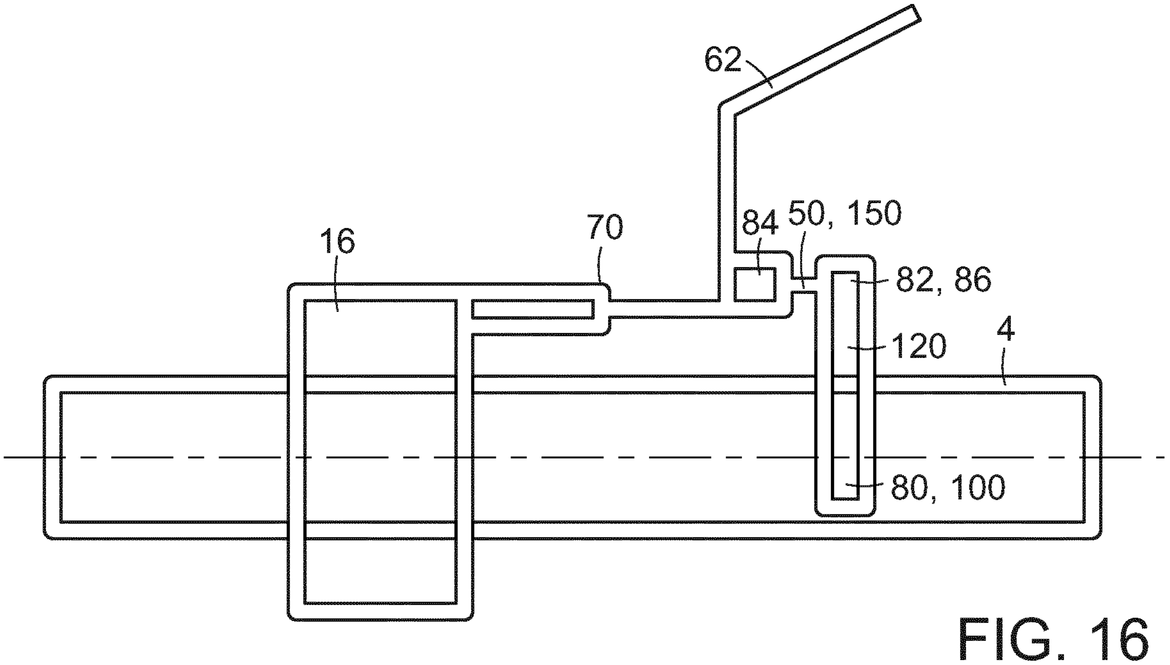
FIG. 16 is a schematic diagram of the fuel injector prior to the overmolding step for a terminal blade in which the sacrificial portion is located in the clip body.
Figure 17:
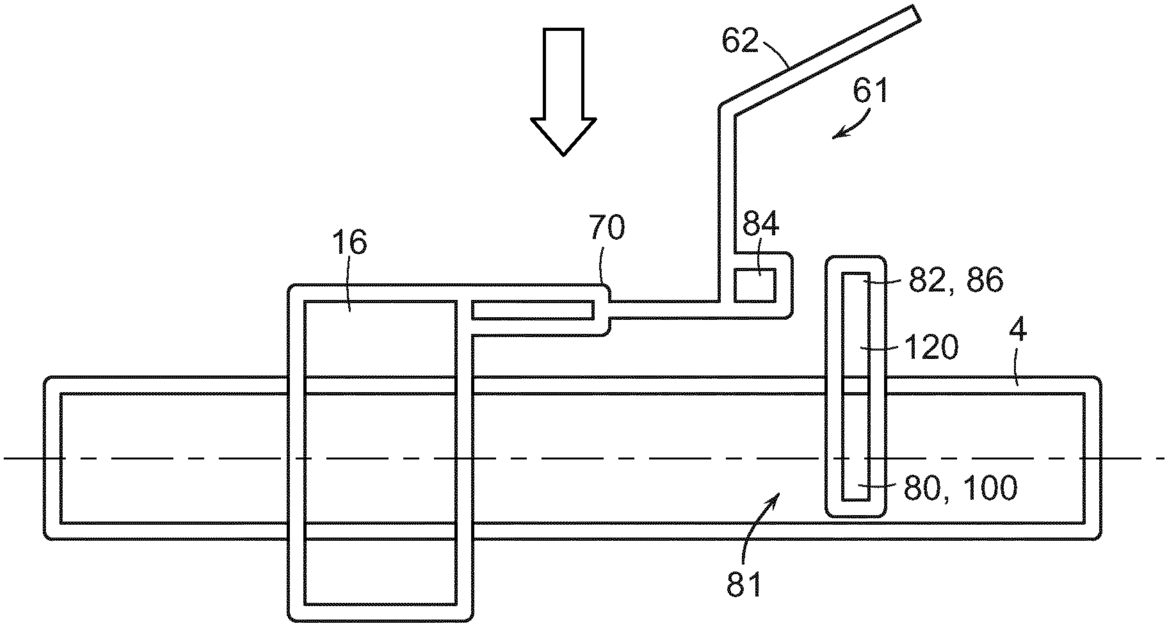
FIG. 17 is a schematic illustration of the fuel injector of FIG. 16 after the overmolding step, with the overmold omitted and showing the separation of the terminal blade into two spaced portions.

The results of the dissolution of the sacrificial portion 50, 150 of the terminal blade 60, 160 are schematically illustrated in FIGS. 16 and 17. In the terminal blade 60, 160, the sacrificial portion 50, 150 is disposed in the clip body mid portion 88. Following the overmolding step, the sacrificial portion 50, 150 no longer exists, and the terminal blade 60, 160 is separated into the a bus bar portion 61 and a clip portion 81 that are physically spaced apart. As seen in FIG. 17, the bus bar portion 61 includes the bus bar 62 and the clip body first end 84, whereas the clip portion 81 includes the clip body second end 86, the bridge 120 and the elastic portion 100.

Figure 19:
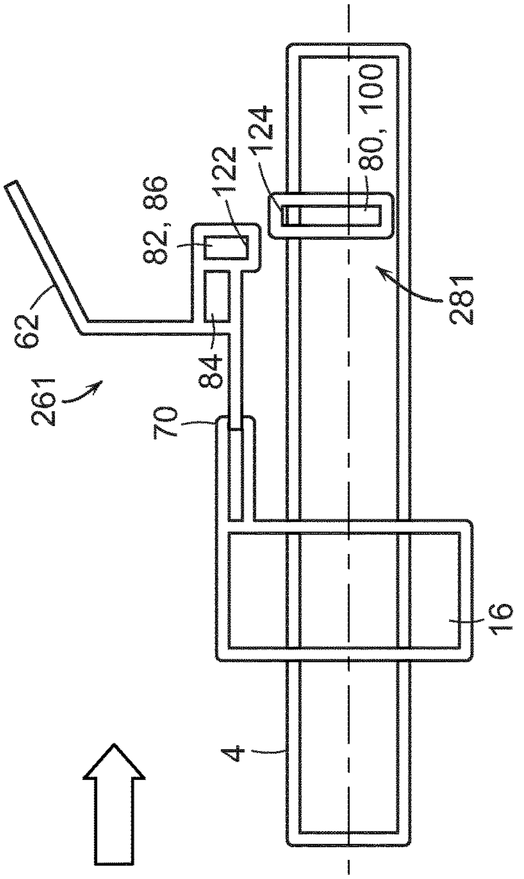
FIG. 19 is a schematic illustration of the fuel injector of FIG. 18 after the overmolding step, with the overmold omitted and showing the separation of the terminal blade into two spaced portions.
Figure 18:
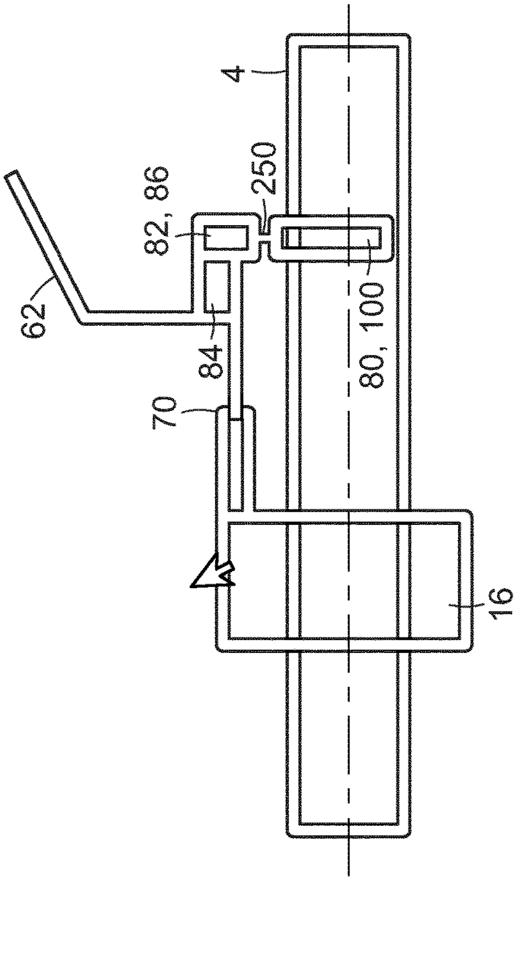
FIG. 18 is a schematic diagram of the fuel injector prior to the overmolding step for a terminal blade in which the sacrificial portion is located in the clip bridge.

The results of the dissolution of the sacrificial portion 250 of the terminal blade 260 are schematically illustrated in FIGS. 18 and 19. In the terminal blade 260, the sacrificial portion 250 is disposed in the bridge mid portion 126. Following the overmolding step, the sacrificial portion 250 no longer exists, and the terminal blade 160 is separated into the bus bar portion 261 and a clip portion 281 that are physically spaced apart. As seen in FIG. 20, the bus bar portion 261 includes the bus bar 62, the clip body 82, and the bridge first end 122, whereas the clip portion 281 includes the bridge second end 124 and the elastic portion 100.

Although in the illustrated embodiment, the plastic material used to form the overmold 40 is the same plastic material that is used to form the clip 80, the fuel injector 2 is not limited to this configuration. For example, in some embodiments, the overmold 40 is formed of a first material and the clip 80 is formed of a second material. The melting temperature of the second material is less than or equal to the melting temperature of the first material to facilitate melting of the sacrificial portion 50 during the overmolding step. When the melting temperature of the second material used to form the clip 80 is less than the melting temperature of the first material used to form the overmold 40, it is advantageous to form the brace 78 of a material that is the same as the first material or has a melting temperature that is higher than that of the first material.

Although in the illustrated embodiments, the clip 80 includes a single sacrificial portion 50, 150, 250, which may be disposed at either at the body 82 or the bridge 120, it is contemplated that the clip 80 may include more than one sacrificial portion, for example including a sacrificial portion at each of the body 82 and the bridge 120. Moreover, the location of the sacrificial portion 50, 150, 250 is not limited to a mid portion 88 of the clip body 82 or the mid portion 126 of the bridge 120. Instead, the sacrificial portion 50, 150, 250 may be located anywhere along the clip 80 as long as the sacrificial portion 50, 150, 250 does not contact the bus bar 62. The position and geometry of the sacrificial portion 50, 150, 250 are determined by the overmold tool and the final overmold process.

Although the terminal blade having a sacrificial portion is illustrated herein with respect to providing an electrical connection between the solenoid and an external connector of a fuel injector, the terminal blade is not limited to this application. For example, in some embodiments, a self-supporting electrical conductor may be used to provide an electrical connection. In particular, the self-supporting electrical conductor includes an electrically conductive element that is configured to electrically connect a first electrical component to a second electrical component. The self-supporting electrical conductor includes a clip that is configured to support the element relative to a device. The clip has a sacrificial portion disposed between the opposed ends of the clip. In addition, the self-supporting electrical conductor has an overmold that encapsulates at least a portion of the clip and the element. As in the previous embodiments, the sacrificial portion is configured to part when the self-supporting electrical conductor undergoes an overmolding process to provide the overmold, and the parting occurs in such a way that the clip is separated into multiple portions.

Selective illustrative embodiments of the fuel injector assembly including the terminal blade and the method of manufacturing the fuel injector are described above in some detail. It should be understood that only structures considered necessary for clarifying certain features of the assembly and method have been described herein. Other conventional structures, and ancillary and auxiliary components of the assembly and method are assumed to be known and understood by those skilled in the art. Moreover, while working examples of the assembly and method have been described above, the assembly and method are not limited to the working examples described above, but various design alterations may be carried out without departing from the terminal blade, fuel injector assembly and method as set forth in the claims.

We claim:

1. A terminal blade fora fuel injector that includes include a valve housing that supports an injector valve, and a magnetic coil that surrounds the valve housing and is configured to actuate the valve, the terminal blade configured to provide an electrical connection between the magnetic coil and an electrical connector, the terminal blade comprising:

an electrically conductive bus bar that is configured to form an electrical connection with the electrical connector and the magnetic coil; and a clip that is connected to the bus bar at a clip first end and to the valve housing at a clip second end, the clip including a sacrificial portion, the sacrificial portion configured to part when the terminal blade undergoes an overmolding process in such a way that the clip is separated into multiple portions.

2. The terminal blade of claim 1, wherein the sacrificial portion is configured to dissolve when the terminal blade undergoes an overmolding process.

3. The terminal blade of claim 1, wherein the clip comprises an elongate body having a body first end that is secured to the bus bar and a body second end that is opposed to the body first end, the body first end corresponding to the clip first end, an elastic portion that is configured to encircle a portion of the valve housing, the elastic portion corresponding to the clip second end, and a bridge that connects the body second end to the elastic portion, and wherein one of the body and the bridge includes the sacrificial portion.

4. The terminal blade of claim 3, wherein the body includes a body mid portion disposed between the body first end and the body second end, and the body mid portion comprises the sacrificial portion.

5. The terminal blade of claim 4, wherein the sacrificial portion is a single connecting structure having a cross sectional dimension that is in a range of 0.2-0.5 times the cross sectional dimension of the body.

6. The terminal blade of claim 4, wherein the sacrificial portion includes at least two connecting structures, and cross sectional dimensions of each of the at least two connecting structures have a range of 0.2-0.5 times a cross sectional dimension of the body.

7. The terminal blade of claim 4, wherein the sacrificial portion comprises a first connecting structure and a second connecting structure that is spaced apart from the first connecting structure, each of the first connecting structure and the second connecting structure extending in parallel to a clip body longitudinal axis and providing a mechanical connection between the first end and the second end.

8. The terminal blade of claim 3, wherein the bridge comprises the sacrificial portion.

9. The terminal blade of claim 8, wherein the bridge has a dimension in a direction parallel to a longitudinal axis of the valve housing that is less than a dimension of the elastic portion in a direction parallel to the longitudinal axis of the valve housing.

10. The terminal blade of claim 8, wherein the bridge, including the sacrificial portion, is connected to the elastic portion along an edge of the elastic portion.

11. The terminal blade of claim 3, wherein the body includes a body longitudinal axis that extends between the body first end and the body second end, the body is elongated along a body longitudinal axis, the body longitudinal axis extends in parallel to a longitudinal axis of the valve housing, and the bridge extends in a direction perpendicular to the body longitudinal axis.

12. The terminal blade of claim 3, wherein the bus bar has a bus bar first end and a bus bar second end, and the clip body first end is fixed to the bus bar at a location that is disposed between the bus bar first end and the bus bar second end.

13. A fuel injector assembly comprising:

a valve housing;

a valve stem that is disposed in the valve housing and moveable relative to an inner surface of the valve housing along a valve housing longitudinal axis, a magnetic coil that surrounds the valve housing and is used to actuate the valve stem; and a terminal blade that is configured to provide an electrical connection between the magnetic coil and an external connector, the terminal blade comprising:

an electrically conductive bus bar that is configured to form an electrical connect the external connector and the magnetic coil; and a clip that is connected to the bus bar at a clip first end and to the valve housing at a clip second end, the clip including a sacrificial portion, the sacrificial portion configured to part when the terminal blade undergoes an overmolding process in such a way that the clip is separated into multiple portions.

14. The fuel injector assembly of claim 13, wherein the sacrificial portion configured to dissolve when the terminal blade undergoes an overmolding process.

15. The fuel injector assembly of claim 13, wherein the clip comprises an elongate body having a body first end that is secured to the bus bar and a body second end that is opposed to the body first end, the body first end corresponding to the clip first end, an elastic portion that is configured to encircle a portion of the valve housing, the elastic portion corresponding to the clip second end, and a bridge that connects the body second end to the elastic portion, and wherein one of the body and the bridge includes the sacrificial portion.

16. The fuel injector assembly of claim 15, wherein the body includes a body mid portion disposed between the body first end and the body second end and the body mid portion comprises the sacrificial portion.

17. The fuel injector assembly of claim 15, wherein the bridge comprises the sacrificial portion.

18. The fuel injector assembly of claim 13, comprising an oven hold that encases the clip and a portion of the bus bar, the overmold and the clip being formed of the same material.

19. The fuel injector assembly of claim 13, comprising an overmold that encases the clip and a portion of the bus bar, the overmold being formed of a first material, and the clip is formed of a second material, and a melting temperature of the second material is less than or equal to a melting temperature of the first material.

* * * * *